United States Patent [19]
Stephenson, III

[11] Patent Number: 6,031,996
[45] Date of Patent: Feb. 29, 2000

[54] MULTIPLE LENS CAMERA FOR TAKING SUCCESSIVE EXPOSURES

[75] Inventor: Stanley W. Stephenson, III, Spencerport, N.Y.

[73] Assignee: Eastman Kodak Company, Rochester, N.Y.

[21] Appl. No.: 09/231,915

[22] Filed: Jan. 14, 1999

[51] Int. Cl.$^7$ .............................. G03B 17/02; G03B 41/00
[52] U.S. Cl. ................................ 396/6; 396/335; 396/340; 396/448
[58] Field of Search ................................ 396/6, 322, 335, 396/336, 337, 338, 340, 448

[56] References Cited

U.S. PATENT DOCUMENTS

| | | | |
|---|---|---|---|
| 475,919 | 5/1892 | Barril | 396/336 |
| 2,596,740 | 5/1952 | Tuttle et al. | 396/335 |
| 3,202,069 | 8/1965 | Cummins et al. | 396/335 |
| 3,935,580 | 1/1976 | Klainos | 396/336 |
| 3,984,850 | 10/1976 | Bley | 396/340 |
| 4,101,913 | 7/1978 | Gallistel et al. | 396/335 |
| 4,621,915 | 11/1986 | Klainos | 396/336 |
| 5,210,557 | 5/1993 | Kameyama et al. | 396/335 |
| 5,264,882 | 11/1993 | Kameyama et al. | 396/335 |
| 5,363,161 | 11/1994 | Kameyama | 395/340 |
| 5,424,792 | 6/1995 | Mikami | 396/335 |
| 5,477,291 | 12/1995 | Mikami et al. | 396/335 |
| 5,694,620 | 12/1997 | Wilk et al. | 396/6 |
| 5,710,953 | 1/1998 | Stephenson | 396/335 |
| 5,734,929 | 3/1998 | Brogden et al. | 396/6 |
| 5,819,127 | 10/1998 | Yokota | 396/349 |

*Primary Examiner*—Eddie C. Lee
*Attorney, Agent, or Firm*—Roger A. Fields

[57] ABSTRACT

A camera comprising a plurality of taking lenses, respective exposure apertures behind the taking lenses, and a shutter disk rotatable for moving various holes in the shutter disk to uncover and recover the exposure apertures, is characterized in that a restraining mechanism for engaging the shutter disk to prevent rotation of the shutter disk is movable out of engagement with the shutter disk to permit rotation of the shutter disk and into position for re-engagement with the shutter disk to stop rotation of the shutter disk, and a front cover part is movable in an exposure initiating direction to uncover the taking lenses and move the restraining mechanism out of engagement with the shutter disk and in an opposite resetting direction to recover the taking lenses and move the restraining mechanism into position for re-engagement with the shutter disk. Preferably, the holes in the shutter disk and the exposure apertures are relatively arranged to permit the shutter disk to successively uncover and recover each one of the exposure apertures when the shutter disk is rotated in only a single direction.

6 Claims, 3 Drawing Sheets

MULTIPLE LENS CAMERA FOR TAKING SUCCESSIVE EXPOSURES

FIELD OF THE INVENTION

The invention relates generally to the field of photography, and in particular to cameras. More specifically, the invention relates to a multiple lens camera for taking successive exposures.

BACKGROUND OF THE INVENTION

Multiple lens cameras for taking successive exposures are generally known.

For example, prior art U.S. Pat. No. 5,710,953 issued Jan. 20, 1998 discloses a multiple lens camera for use with a rectangular-shaped film sheet having eight imaging areas. The camera has eight taking lens and a similar number of exposure apertures behind the taking lenses. Respective shutters are individually operated to uncover and recover the exposure apertures to successively expose the film imaging areas.

Prior art U.S. Pat. No. 5,264,882 issued Nov. 23, 1993 discloses a multiple lens camera for use with a filmstrip in which each film frame is divided into eight imaging (sub-frame) areas. The camera has eight taking lenses and a similar number of exposure apertures behind the taking lenses. Two shutter disks each with four holes are coaxially rotated first in one direction to align respective pairs of the holes in the shutter disks to successively uncover and recover four of the film imaging areas and then in reverse direction to align respective pairs of the holes to successively uncover and recover four more imaging areas.

SUMMARY OF THE INVENTION

A camera comprising a plurality of taking lenses, respective exposure apertures behind the taking lenses, and a shutter disk rotatable for moving various holes in the shutter disk to uncover and recover the exposure apertures, is characterized in that:

a restraining mechanism for engaging the shutter disk to prevent rotation of the shutter disk is movable out of engagement with the shutter disk to permit rotation of the shutter disk and into position for re-engagement with the shutter disk to stop rotation of the shutter disk; and a front cover part is movable in an exposure initiating direction to uncover the taking lenses and move the restraining mechanism out of engagement with the shutter disk and in an opposite resetting direction to recover the taking lenses and move the restraining mechanism into position for re-engagement with the shutter disk. Preferably, the holes in the shutter disk and the exposure apertures are relatively arranged to permit the shutter disk to successively uncover and recover each one of the exposure apertures when the shutter disk is rotated in only a single direction.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
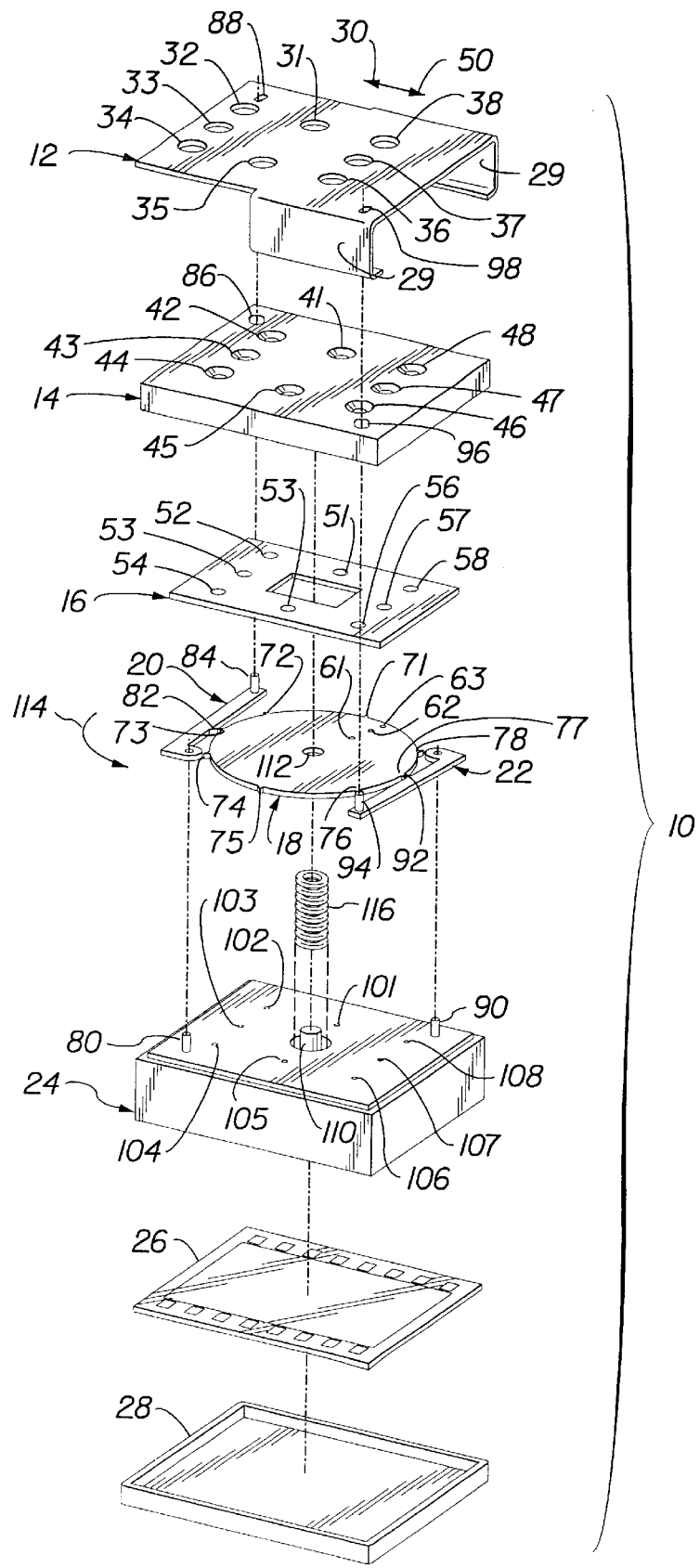
FIG. 1 is an exploded perspective view of a multiple lens camera according to a preferred embodiment of the invention.
Figure 6:
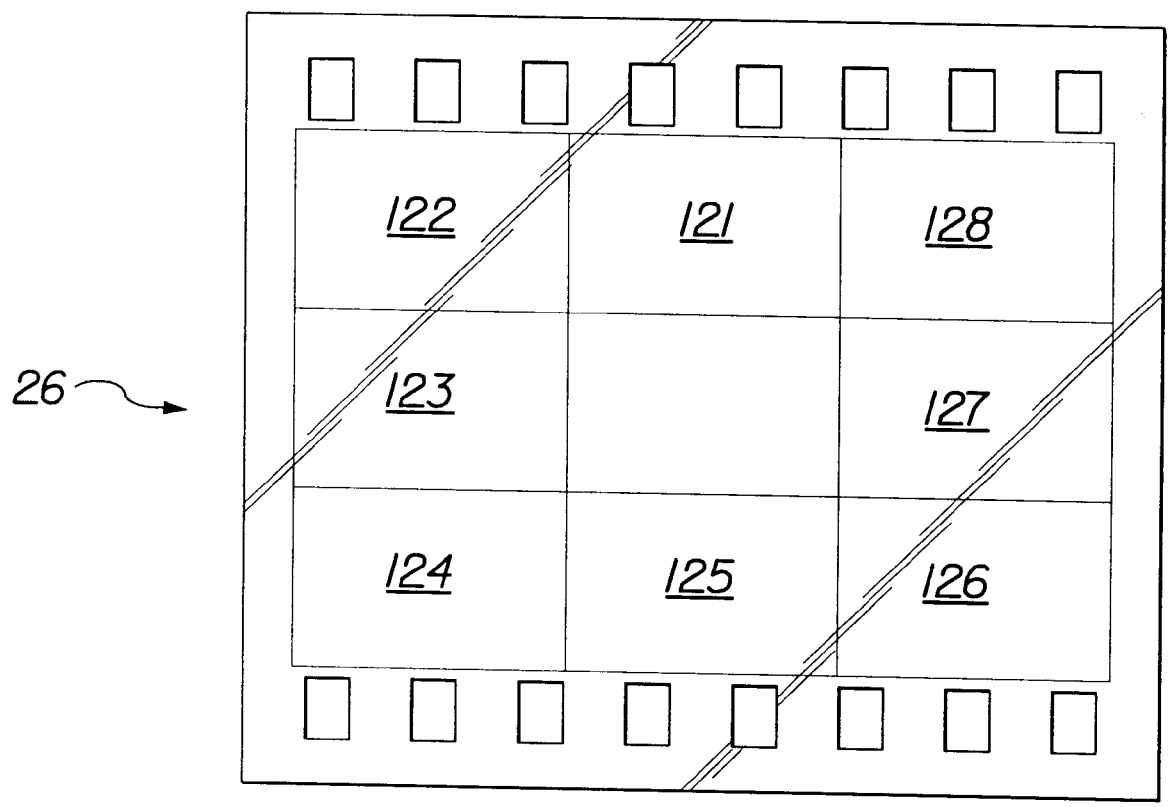
FIG. 6 is a plan view of a film sheet in the camera

Referring now to the drawings, FIG. 1 shows a camera 10 comprising a translatable opaque front outer cover part or lens cover 12, a stationary opaque front inner cover part 14, a stationary transparent lens plate 16, an opaque rotary shutter disk 18, a pair of pivotable restraining pawls 20 and 22, a stationary opaque main body part 24, a stationary unexposed 35 mm film chip 26, and a stationary opaque rear outer cover part 28. The front outer cover part 12 has a pair of parallel facing flanges 29, 29 that are coupled with the main body part 24 to enable the front outer cover part to be translated in an exposure initiating direction 30 (to the left in FIG. I) for eight identical outer lens openings 31, 32, 33, 34, 35, 36, 37 and 38 in the front outer cover part to optically align with eight identical inner lens openings 41, 42, 43, 44, 45, 46, 47 and 48 in the front inner cover part 14 and to be translated in an opposite resetting direction 50 (to the right in FIG. 1) for the front outer cover part to recover the inner lens openings. The lens plate 16 has eight integral identical taking lenses 51, 52, 53, 54, 55, 56, 57 and 58 behind the respective inner lens openings 41, 42, 43, 44, 45, 46 ,47 and 48. The shutter disk 18 has three identical round exposure holes 61, 62, 63 along a single radius ( i.e. a line segment extending from the center of a circle to its circumference) 65 of the shutter disk and has eight peripheral engageable projections 71, 72, 73, 74, 75, 76, 77 and 78 that are unevenly spaced from one another. The restraining pawl 20 is pivotally supported on an upstanding fixed post 80 on the main body part 24, has a single pawl tooth 82 for engaging the peripheral engageable projections 71, 72, 73, 74, 75, 76, 77 and 78 on the shutter disk 18, and has an upstanding follower pin 84 that longitudinally extends through a clearance hole 86 in the front inner cover part 14 and into an actuating slot 88 in the front outer cover part 12. The restraining pawl 22 is pivotally supported on an upstanding fixed post 90 on the main body part 24, has a single pawl tooth 92 for engaging the peripheral engageable projections 71, 72, 73, 74, 75, 76, 77 and 78 on the shutter disk 18, and has an upstanding follower pin 94 that longitudinally extends through a clearance hole 96 in the front inner cover part 14 and into an actuating slot 98 in the front outer cover part 12. The main body part 24 has eight identical round exposure apertures 101, 102, 103, 104, 105, 106 107 and 108 beneath the shutter disk 18 and optically aligned with the respective taking lenses 51, 52, 53, 54, 55, 56, 57 and 58. A fixed center post 110 on the main body part 24 longitudinally extends through a center hole 112 in the shutter disk 18 to supports the shutter disk for rotation in a single direction 114 (counter-clockwise in FIG. 1). A prewound helical tension spring 116 biases (urges) the shutter disk 18 to rotate in the single direction 114. The film chip 26, as indicated in FIG. 6, has eight 12 mm×8 mm imaging areas 121, 122, 123, 124, 125, 126, 127 and 128.

The eight outer lens openings 31, 32, 33, 34, 35, 36, 37 and 38 in the front outer cover part 12, the eight inner lens openings 41, 42, 43, 44, 45, 46, 47 and 48 in the front inner cover part 14, the eight taking lenses 51, 52, 53, 54, 55, 56, 57 and 58 in the lens plate 16, and the eight exposure apertures 101, 102, 103, 104, 105, 106 107 and 108 in the main body part 24 are each arranged to outline an ordinary rectangle to obtain expose the eight imaging areas 121, 122, 123, 124, 125, 126, 127 and 128 on the film chip 26

OPERATION

Figure 2:
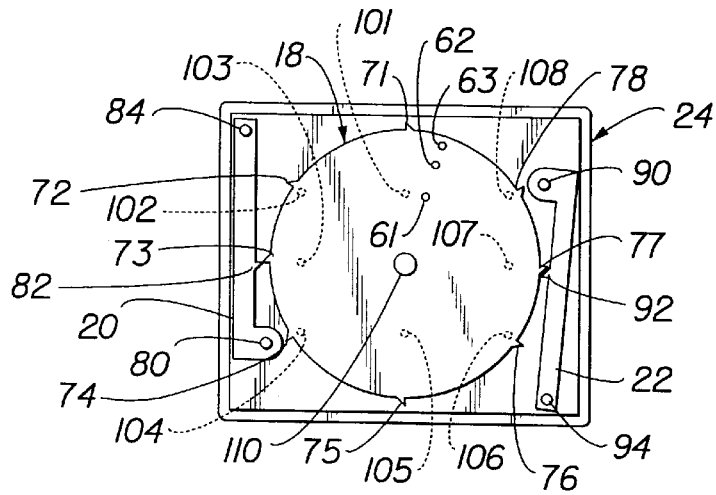
FIGS. 2, 3, 4 and 5 are plan views of the camera depicting its operation to make an exposure.
Figure 3:
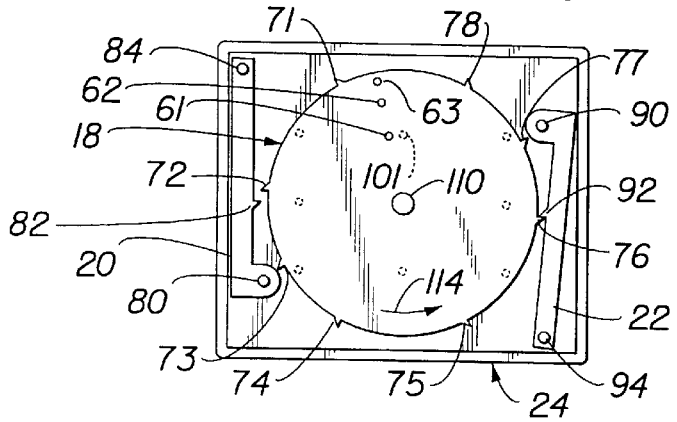

Beginning with FIG. 2, when the front outer cover part 12 is translated in the exposure initiating direction 30, its outer lens openings 31, 32, 33, 34, 35, 36, 37 and 38 uncover the inner lens openings 41, 42, 43, 44, 45, 46, 47 and 48 in the front inner cover part 14, its actuating slot 88 cams the follower pin 84 on the restraining pawl 20 to pivot the restraining pawl counter-clockwise about the fixed post 80 on the main body part 24 to disengage the pawl tooth 82 from the engageable projection 73 on the shutter disk 18, and its actuating slot 98 cams the follower pin 94 on the restraining pawl 22 to pivot the restraining pawl clockwise about the fixed post 90 on the main body part to position the pawl tooth 92 for engagement with the engageable projection 76 on the shutter disk. Then, in FIG. 3, the spring 116 rotates the shutter disk 18 in the single direction 114 (counter-clockwise) for the exposure hole 61 in the shutter disk to briefly uncover the exposure aperture 101 in the main body part 24 and expose the imaging area 121 on the film chip 26. The shutter disk 18 recovers the exposure aperture 101 before the engageable projection 76 is moved into engagement with the pawl tooth 92 to stop the shutter disk.

Figure 4:
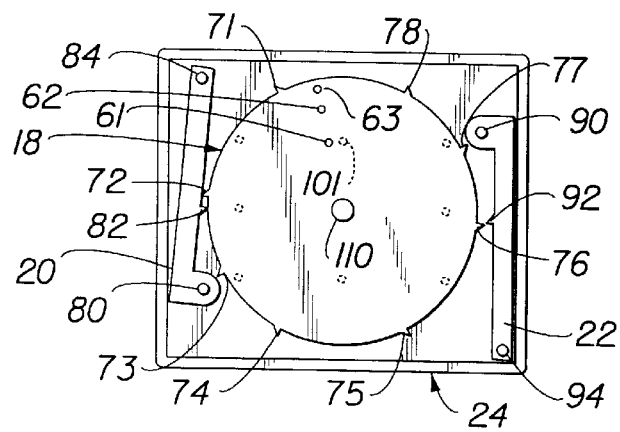
Figure 5:
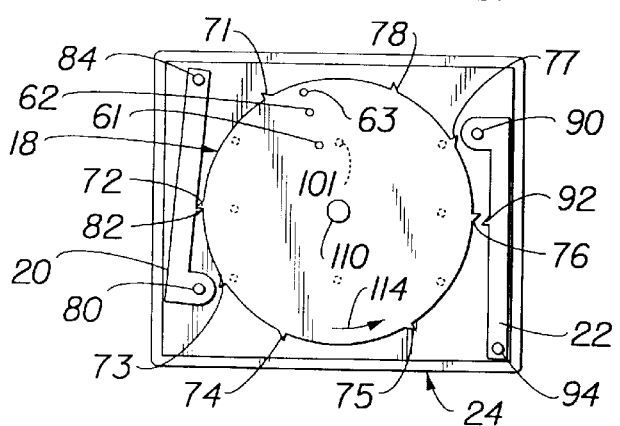

Next, in FIG. 4, when the front outer cover part 12 is translated in the opposite resetting direction 50, its outer lens openings 31, 32, 33, 34, 35, 36, 37 and 38 recover the inner lens openings 41, 42, 43, 44, 45, 46, 47 and 48 in the front inner cover part 14, its actuating slot 88 cams the follower pin 84 on the restraining pawl 20 to pivot the restraining pawl clockwise about the fixed post 80 on the main body part 24 to position the pawl tooth 82 for engagement with the engageable projection 72 on the shutter disk 18, and its actuating slot 98 cams the follower pin 94 on the restraining pawl 22 to pivot the restraining pawl counter-clockwise about the fixed post 90 on the main body part to disengage the pawl tooth 92 from the engageable projection 76 on the shutter disk. Then, in FIG. 5, the spring 116 rotates the shutter disk 18 in the single direction 114 (counter-clockwise) to move the engageable projection 72 into engagement with the pawl tooth 82 to stop the shutter disk.

Seven more exposure cycles similar to the one in FIGS. 2–5 can be performed to expose the respective imaging areas 122, 123, 124, 125, 126, 127 and 128 in succession on the film chip 26 shown in FIG. 6. In the second exposure cycle, the exposure hole 63 in the shutter disk 18 briefly uncovers the exposure aperture 102 in the main body part 24 to expose the imaging area 122 on the film chip 26. In the third exposure cycle, the exposure hole 62 in the shutter disk 18 briefly uncovers the exposure aperture 103 in the main body part 24 to expose the imaging area 123 on the film chip 26. In the fourth exposure cycle, the exposure hole 63 in the shutter disk 18 briefly uncovers the exposure aperture 104 in the main body part 24 to expose the imaging area 124 on the film chip 26. In the fifth exposure cycle, the exposure hole 61 in the shutter disk 18 briefly uncovers the exposure aperture 105 in the main body part 24 to expose the imaging area 125 on the film chip 26. In the sixth exposure cycle, the exposure hole 63 in the shutter disk 18 briefly uncovers the exposure aperture 106 in the main body part 24 to expose the imaging area 126 on the film chip 26. In the seventh exposure cycle, the exposure hole 62 in the shutter disk 18 briefly uncovers the exposure aperture 107 in the main body part 24 to expose the imaging area 127 on the film chip 26. In the eight exposure cycle, the exposure hole 63 in the shutter disk 18 briefly uncovers the exposure aperture 108 in the main body part 24 to expose the imaging area 128 on the film chip 26.

The invention has been described with reference to a preferred embodiment. However, it will be appreciated that variations and modifications can be effected by a person of ordinary skill in the art without departing from the scope of the invention.

What is claimed is:

1. A camera comprising a plurality of taking lenses, respective exposure apertures behind said taking lenses, and a shutter disk rotatable for moving various holes in said shutter disk to uncover and recover said exposure apertures, is characterized in that:

a front cover part is movable in an exposure initiating direction to uncover said taking lenses and in an opposite resetting direction to recover said taking lenses; and at least two restraining pawls are coupled with said front cover part for a first one of said pawls to move out of engagement with said shutter disk and a second one of said pawls to move into position for re-engagement with the shutter disk when said front cover part is moved in the exposure initiating direction and for said second one of the pawls to move out of engagement with said shutter disk and said first one of the pawls to move into position for re-engagement with the shutter disk when the front cover part is moved in the resetting direction.

2. A camera as recited in claim 1, wherein said holes in said shutter disk are along a single radius of the shutter disk.

3. A camera as recited in claim 1, wherein said shutter disk is rotatable in a single direction to uncover and recover said exposure apertures and engage whichever one of said restraining pawls is in position for re-engagement with the shutter disk.

4. A camera as recited in claim 1, wherein a spring continuously urges said shutter disk to rotate in the single direction.

5. A camera as recited in claim 1, wherein said front cover part is translated to move in the exposure initiating and resetting directions, and said restraining pawls are pivoted to move out of engagement with said shutter disk and into position for re-engagement with the shutter disk.

6. A camera as recited in claim 1, wherein said shutter disk has peripheral engageable portions shaped to successively engage whichever one of said restraining pawls is in position for re-engagement with the shutter disk, equal in number to the number of said taking lenses, and unevenly spaced from one another.

* * * * *